United States Patent
Schou et al.

(10) Patent No.: US 7,893,630 B2
(45) Date of Patent: Feb. 22, 2011

(54) ROYER OSCILLATOR WITH DISCHARGE ELECTRONICS

(75) Inventors: Guy Schou, Le Bouscat (FR); Frederic Renaud, Limeyrat (FR)

(73) Assignee: Thales (FR)

( * ) Notice: Subject to any disclaimer, the term of this patent is extended or adjusted under 35 U.S.C. 154(b) by 231 days.

(21) Appl. No.: 11/817,784

(22) PCT Filed: Feb. 27, 2006

(86) PCT No.: PCT/EP2006/060308

§ 371 (c)(1),
(2), (4) Date: Sep. 4, 2007

(87) PCT Pub. No.: WO2006/092390

PCT Pub. Date: Sep. 8, 2006

(65) Prior Publication Data

US 2008/0170181 A1    Jul. 17, 2008

(30) Foreign Application Priority Data

Mar. 1, 2005    (FR) .................................. 05 02064

(51) Int. Cl.
*G05F 1/00*    (2006.01)

(52) U.S. Cl. .................. 315/307; 315/291; 315/276; 315/278; 315/224; 315/209 R; 363/124; 363/133; 363/21.09; 363/21.1

(58) Field of Classification Search ............... 315/307, 315/291, 247, 219, 224, 209 R, 276, 278, 315/244, 257, 225, 312, DIG. 4, DIG. 7; 363/23, 25, 26, 21.01, 21.09, 21.1, 37, 95, 363/124, 133

See application file for complete search history.

(56) References Cited

U.S. PATENT DOCUMENTS

| 5,615,093 | A  | * | 3/1997  | Nalbant ........................ 363/25 |
| 5,640,313 | A  | * | 6/1997  | Takehara et al. .............. 363/97 |
| 5,939,830 | A  |   | 8/1999  | Praiswater |
| 6,114,814 | A  | * | 9/2000  | Shannon et al. ............. 315/219 |
| 6,469,454 | B1 | * | 10/2002 | Mader et al. ................. 315/291 |
| 7,365,500 | B2 | * | 4/2008  | Jang ........................... 315/274 |
| 7,498,751 | B2 | * | 3/2009  | Bai et al. .................... 315/247 |
| 2006/0256049 | A1 |   | 11/2006 | Schou |

OTHER PUBLICATIONS

Travis, "Little ICS Generate Long Voltages", EDN Electrical Design News, Reed Business Information, Highlands Ranch, Co., US, vol. 45, No. 13, pp. 73-74, 76, 78, 80 (2000) XP001074433.

* cited by examiner

*Primary Examiner*—Haissa Philogene
(74) *Attorney, Agent, or Firm*—Lowe Hauptman Ham & Berner, LLP

(57) ABSTRACT

The field of the invention is mainly that of light boxes used for the illumination of display screens using optical valves, notably for liquid crystal matrix displays also known as LCD screens. The light sources used are generally fluorescent tubes powered with a high voltage by devices comprising Royer electronic oscillators. These electronic oscillators do not allow wide dynamic ranges of luminance, which can be necessary for certain applications, to be easily attained. The oscillator according to the invention comprises an electronic device for discharging the stored electrical energy, said discharge device being controlled by an electronic control device using chopping modulation, thus enabling wide dynamic ranges of luminance to be attained.

11 Claims, 10 Drawing Sheets

ROYER OSCILLATOR WITH DISCHARGE ELECTRONICS

CROSS-REFERENCE TO RELATED APPLICATIONS

The present Application is based on International Application No. PCT/EP2006/060308, filed Feb. 27, 2006 which in turn corresponds to France Application No. 0502064, filed on Mar. 1, 2005 and priority is hereby claimed under 35 USC § 119 based on these applications. Each of these applications are hereby incorporated by reference in their entirety into the present application.

BACKGROUND OF THE INVENTION

The field of the invention is mainly that of light boxes used for the illumination of display screens using optical valves, notably for liquid crystal matrix displays referred to as LCD screens.

FIELD OF THE INVENTION

The field of application is more particularly that of aircraft onboard displays that require, in order to be used in the daytime under bright sunshine and at night under low-light conditions, a wide dynamic range in the regulation of the emitted quantity of light. This function for the regulation of the emitted light is referred to as 'dimming'. More generally, the invention may also be applied to the consumer product area of flat display screens used either as televisions or as personal computer monitors and requiring a wide dynamic range of luminance.

DESCRIPTION OT THE PRIOR ART

Generally speaking, the light sources for the light boxes are fluorescent tubes. These tubes are most often of the type referred to as cold-cathode tubes, or CCFL (Cold-Cathode Fluorescent Light), which do not require pre-heating of the cathode filament. These light sources present a number of advantages such as their high brightness, their excellent conversion efficiency, their limited size in addition to their high reliability.

Their implementation is however reasonably complex in that they require high AC control voltages, greater than 1000 volts. The frequencies of these voltages are typically a few tens of kiloHertz. These control voltages are generally supplied starting from a low-voltage power supply. A separate power supply device then supplies, starting from this low voltage, the high AC voltage required for the correct operation of fluorescent tubes. These power supply devices are known as 'inverters'. FIG. 1 shows a schematic circuit diagram of such a power supply device. It comprises a device 1 of the inverter type. This device 1 is powered by a low-voltage DC power supply 2 of a few volts. The high AC voltage is delivered to the fluorescent tubes 3 via capacitors $C_B$, known as 'ballast capacitors', which limit the current in the lamps. A 'dimming' control 4 enables the luminance emitted by the fluorescent tubes to be regulated.

Larger diameter lighting tubes in the past contained rudimentary electromechanical power supply systems. Currently, the heart of the power supply device is an electronic oscillator system known as a Royer oscillator. This structure presents the advantages of a very simple construction and of a low production cost. It is now in widespread use in the field of the excitation of fluorescent lamps known as small-format CCFL that are widely used today as illumination sources for display devices.

As indicated in FIG. 2, the Royer structure mainly comprises:

a transformer comprising:
   a first primary magnetic winding comprising two parts P1 and P2, this winding being associated with a capacitor placed in parallel $C_A$,
   a second secondary winding $S_{HT}$ and
   a third winding $S_R$, said windings being conventionally wound around a magnetic circuit T; the voltage elevation is substantially proportional to the ratio of the number of turns in the primary winding over the number of turns in the secondary winding;
a tuned circuit connected in parallel with the primary winding P1, P2. This circuit determines the frequency of oscillation;
an induction coil known as header coil $L_T$.

The winding $S_{HT}$ of the transformer provides the voltage elevation and delivers a high-voltage signal HT to the fluorescent lamps via the ballast capacitors $C_B$ which are associated with each fluorescent lamp.

The winding $S_R$ of the transformer delivers a feedback signal to the tuned circuit designed to maintain the oscillation.

The induction coil $L_T$ allows the center tap of the transformer, between the parts P1 and P2 of the first primary winding, to be biased at high impedance, in order allow its voltage to vary.

The maintenance of the oscillation is achieved by means of two switches Q1 and Q2 controlled by an electronic device 10 placed across the terminals of the winding $S_R$. This device is powered via the resistor $R_P$ by the power supply 2. Each of said switches in turn pulls the current supplied by the induction coil $L_T$ to ground. Q1 and Q2 can be transistors of the MOSFET type or bipolar transistors. Their control is then effected by the superimposition of a common bias fixed at the threshold of their conduction and of the feedback voltage coming from the winding $S_R$ and applied in differential mode between the two switches.

The dimming function performs the modulation of the luminance. This is effected by time modulation. This type of control is called Pulse Width Modulation, or PWM, control. The duration of the active state is controlled over a fixed modulation time period. The frequencies corresponding to this fixed period are generally in the range between 100 and 300 Hertz so as to be beyond the maximum frequencies perceptible by the human eye. Thus, the retinal persistence integrates the rapid variations of the pulsed luminance and the eye only perceives an average luminance proportional to the ratio of the duration of the active state over the modulation period.

With this type of device, the possible dynamic ranges of luminance are usually 1 to 50, and rarely beyond 1 to 100.

However, for certain applications, this dynamic range is insufficient. Thus, for the display screens disposed within the cockpits of aircraft, the requirement for luminance dynamic range is 1 to 1000 as a minimum.

The control of the duration of the inactive state can be achieved on the Royer structure in two different ways:
   Blocking of the two maintaining switches Q1 and Q2 as indicated in FIG. 3 where this function is performed by the switch $Q_{STOP}$ controlled by the dimming command. This blocking is obtained by grounding the biasing of the controls of the switches Q1 and Q2. This method has the drawback of introducing breaks of rhythm into the oscillation, when the protection against the over-voltage inherent in the draining of the energy stored within the induction coil $L_T$ acts. These breaks then create fluctuations in the light response of the lamps at low duty cycles or at low PWM ratios of the dimming. 'Flicker' is then observed in the emitted light energy.

Installation of an additional switch $Q_{STOP}$ in series with the power supply as indicated in FIG. 4. It lets the oscillator operate naturally after a stoppage. In this case, the overvoltage protection of the induction coil $L_T$ does not interfere with the prolongation of activity of the oscillator. As a consequence of this conservation of rhythm, the possibility of reducing the luminance to an even lower level is opened up. This solution is mainly employed in systems requiring the widest dynamic ranges of dimming, but which cannot easily reach the level of the requirement.

In the Royer structure previously described, upon power down, the dimming control interrupts the power consumption. The energy stored in the induction coil $L_T$, in the windings of the transformer and in the capacitor $C_A$ must be dissipated. Since the oscillator comes progressively to a stop, a part of this energy is dissipated in the lamps. After each active alternation of the oscillator, there is therefore an oscillation tail of the voltage applied to the lamps, of exponentially decreasing amplitude. The lamps therefore continue to emit light during this oscillation tail. FIG. 5 illustrates this phenomenon. This figure shows, as a function of time, the variations of:

the PWM dimming control,
the high-voltage output of the Royer oscillator THT,
the current $C_{CCFL}$ flowing through the fluorescent tubes CCFL and
the average quantity of light emitted L by said tubes.

The active state command starts at time $T_{ON}$ and ends at time $T_{OFF}$. As can be seen, after the time $T_{OFF}$, the tubes continue to emit for a certain time.

It can be demonstrated that, the lower the load on the oscillator, in other words the smaller the number of lamps on the output of the oscillator, the longer this duration will be and, consequently, the greater hindrance this will be to reaching the desired low levels of light.

In view of this phenomenon, it is possible to trace the curve of the variation of the quantity of light L as a function of the duration of the active state of the PWM. The curve in FIG. 6 is obtained. This curve demonstrates that it is impossible to reach low luminance levels by this principal. Indeed, below a certain excitation duration $T_{MIN}$, no light is emitted. Then, as soon as this threshold is exceeded, the emitted light intensity $L_{MIN}$ is immediately relatively high.

SUMMARY OT THE INVENTION

The subject of the invention allows this flaw to be overcome to a large extent. The goal of the invention is to control over a wider range the modulation of luminance produced by lamps known as CCFL and to enable the luminance to be regulated at a minimum level which is much lower than that allowed by the usual basic structures. This invention may, of course, be applied to any device comprising a Royer oscillator requiring a fast shutdown of the oscillations and is not limited to the field of fluorescent lamps.

More precisely, a subject of the invention is an electronic oscillator, known as a Royer oscillator, allowing the generation, starting from a low DC voltage, of alternating high voltages modulated over time by chopping, comprising:

a first circuit comprising a voltage transformer with primary and secondary windings;

a second electronic feedback circuit allowing the frequency of the modulated alternating high voltage to be maintained;

characterized in that it comprises an electronic device for controlling the discharge of the electrical energy stored in the first circuit, said discharge control device being controlled by an electronic control device using chopping modulation.

Advantageously, the electronic feedback circuit comprises two regulation switches disposed in series on either side of the primary windings of the transformer and the electronic discharge control device comprises means allowing said switches to be made to conduct simultaneously. In addition, said regulation switches are connected to a common point, itself connected to the low-voltage power supply source via a diode, known as flywheel diode, said common point being able to be grounded by a third switch controlled by the electronic control device using chopping modulation.

Advantageously, the electronic discharge control device is controlled by the voltage of said common point.

Advantageously, the transformer has an adding circuit comprising at least one secondary winding disposed in series between two switches connected to ground, the discharge control device controlling the opening and the closing of said switches. The adding circuit can also comprise at least two resistors placed in series between said winding and said switches. The adding circuit can also comprise an additional circuit comprising, in series, a capacitor and two switches connected to ground.

Another subject of the invention is an electrical power supply device for fluorescent tubes, characterized in that it comprises an electronic oscillator according to one of the previously-defined characteristics. A further subject of the invention is a flat-screen display device comprising at least one source of illumination powered by the preceding power supply device.

BRIEF DESCRIPTION OF THE DRAWINGS

The invention will be better understood and other advantages will become apparent upon reading the description that follows presented by way of non-limiting example and with reference to the appended figures, amongst which:

FIGS. 9, 1 0 and 11 show 3 different embodiments of this variant;

DETAILED DESCRIPTION OF THE DRAWINGS

The symbol scheme used on the various circuit diagrams corresponds to that habitually used for these types of circuit diagram. In particular, the junction nodes are represented by black dots.

In a Royer oscillator structure with dimming by power supply switching, in order to stop almost immediately the oscillation, and therefore the current flowing in the CCFL lamps under charge, the invention consists: in dampening the oscillation at each stimulation pulse train for the lamps. This amounts to automatically discharging the energy stored in the resonant circuit by means of simple electronics and of synchronous operation.

The discharge of the energy of the header induction coil $L_T$ and of the parallel resonant circuit comprising the transformer and the tuning capacitor $C_A$ is achieved by short-circuiting of the transformer. Various electronic devices exist that allow this function to be implemented.

Figure 1:
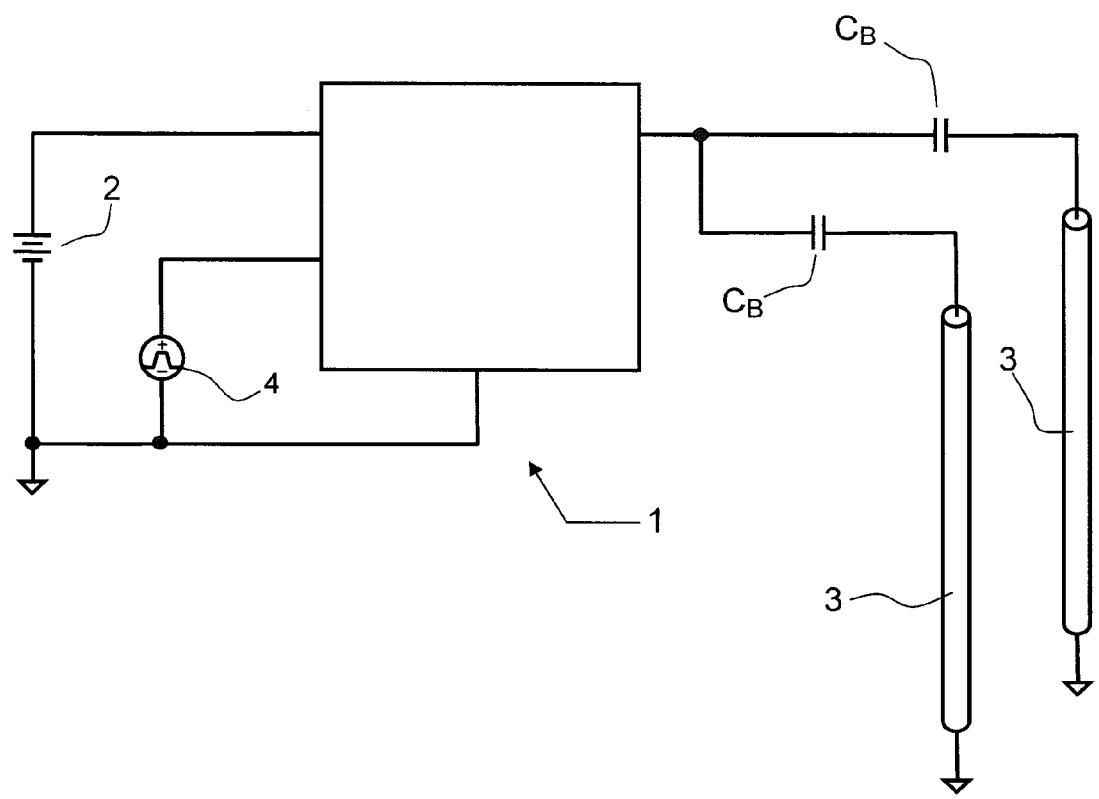
FIG. 1 shows the schematic diagram of a high-voltage power supply device with control by 'dimming'.
Figure 2:
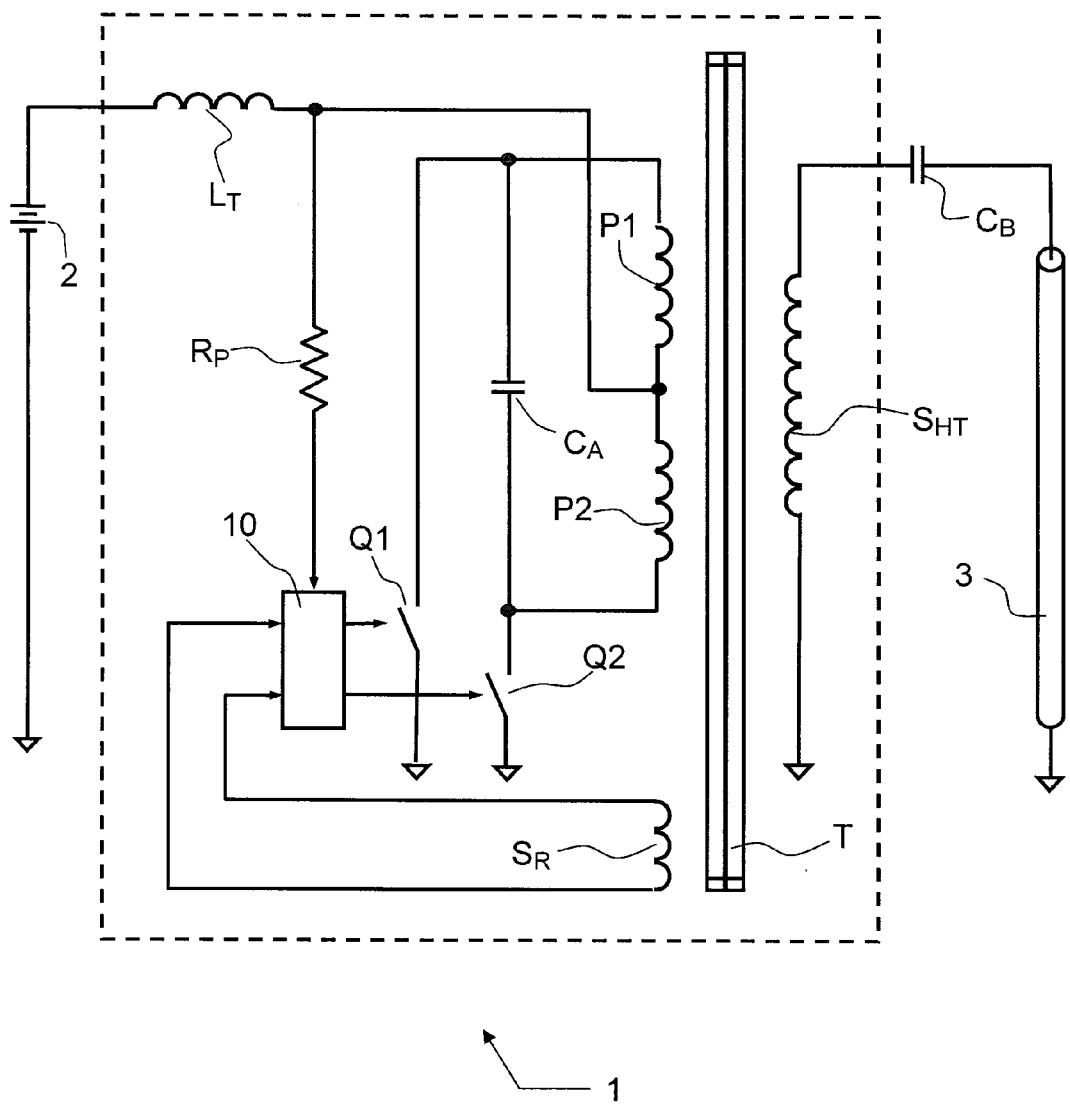
FIG. 2 shows the circuit diagram of a Royer oscillator.
Figure 3:
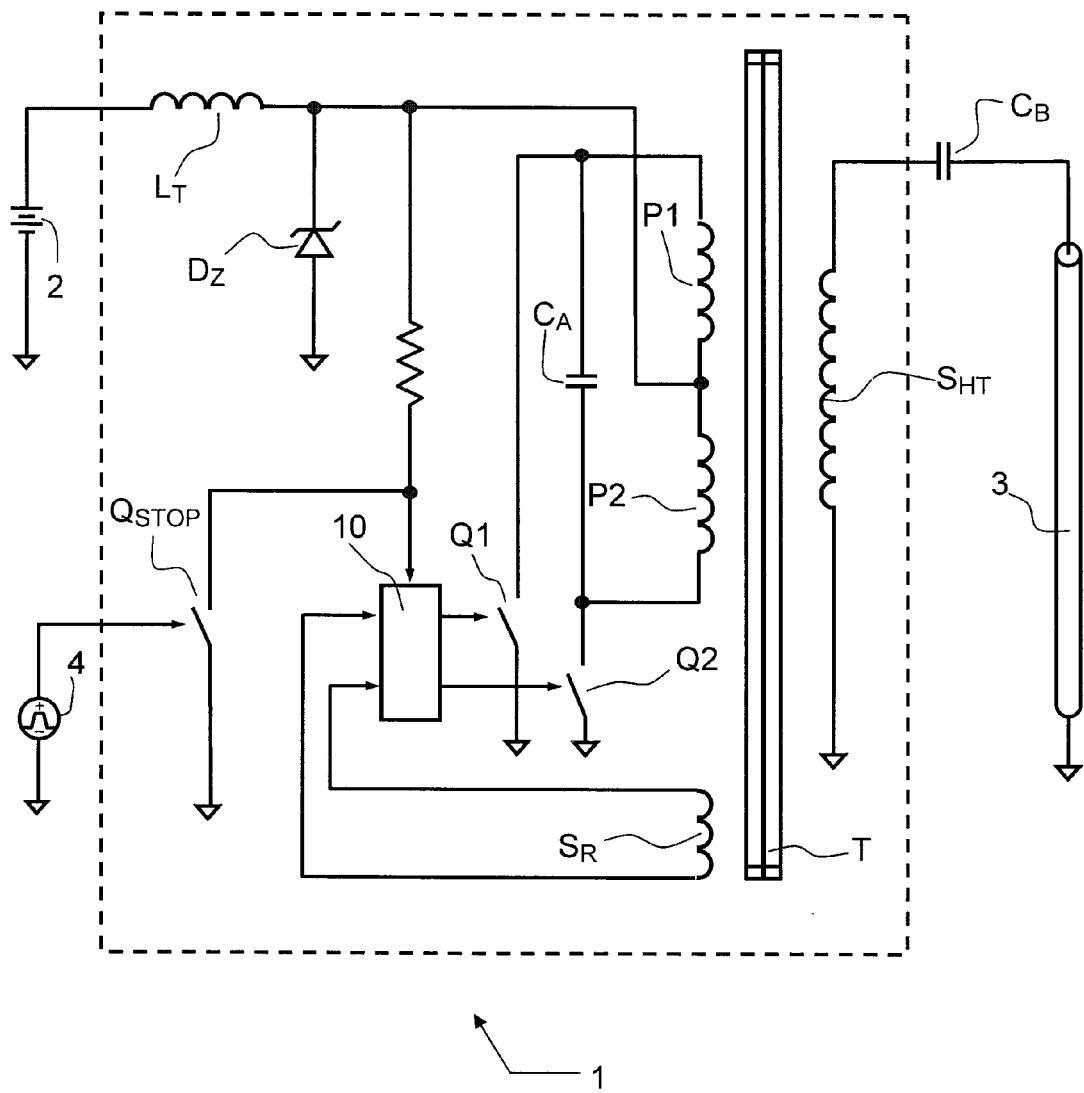
FIG. 3 shows a first control mode by dimming of a Royer oscillator.
Figure 4:
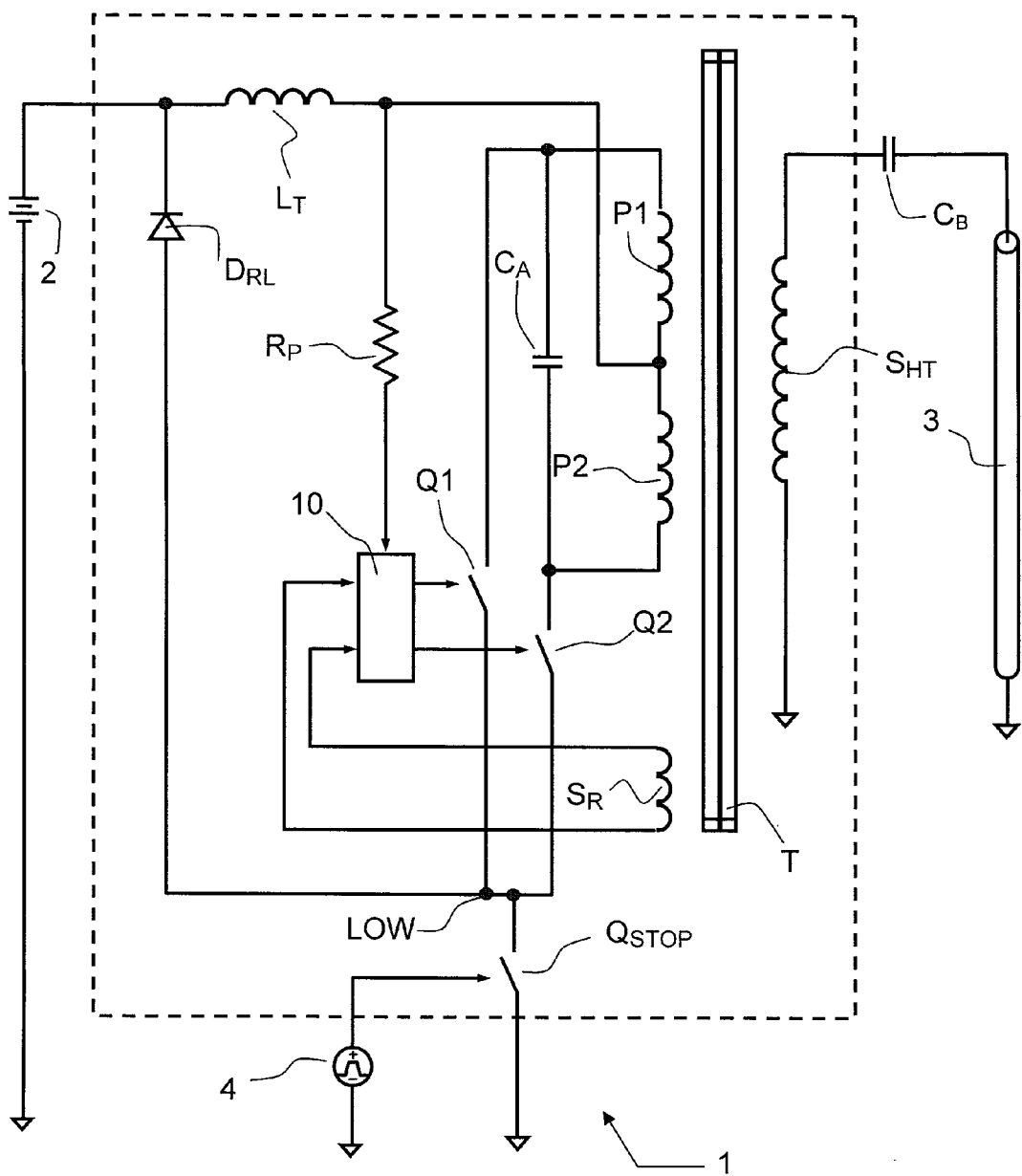
FIG. 4 shows a second control mode by dimming of a Royer oscillator.
Figure 5:
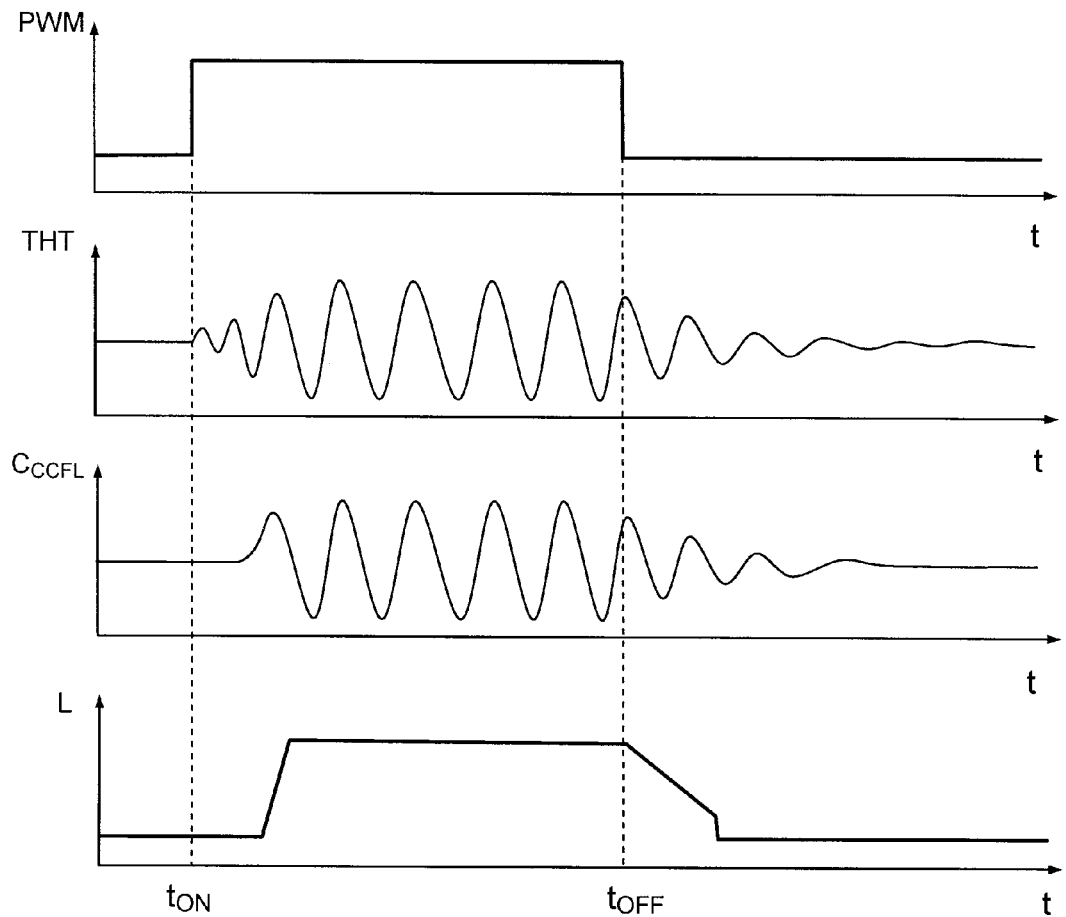
FIG. 5 shows the variations as a function of time of the main parameters of a Royer oscillator.
Figure 6:
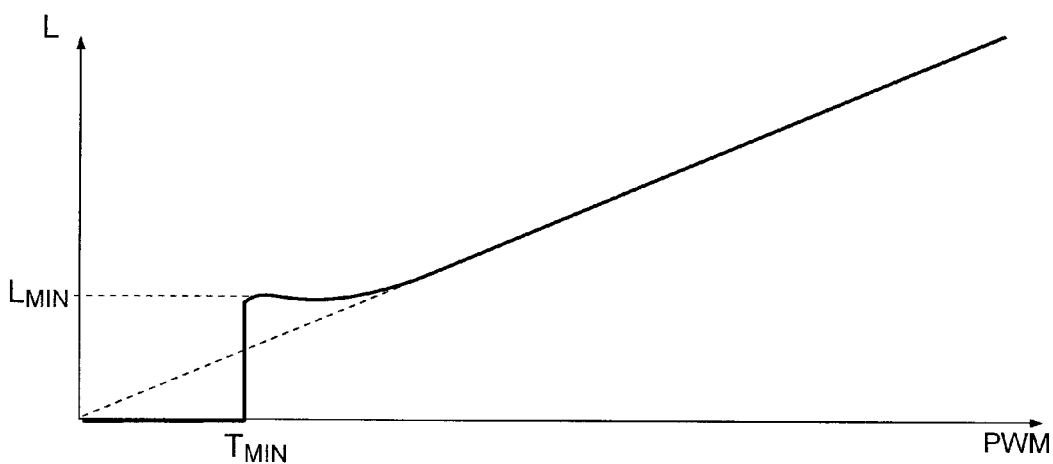
FIG. 6 shows the variations as a function of the dimming control of the emitted luminance.
Figure 7:
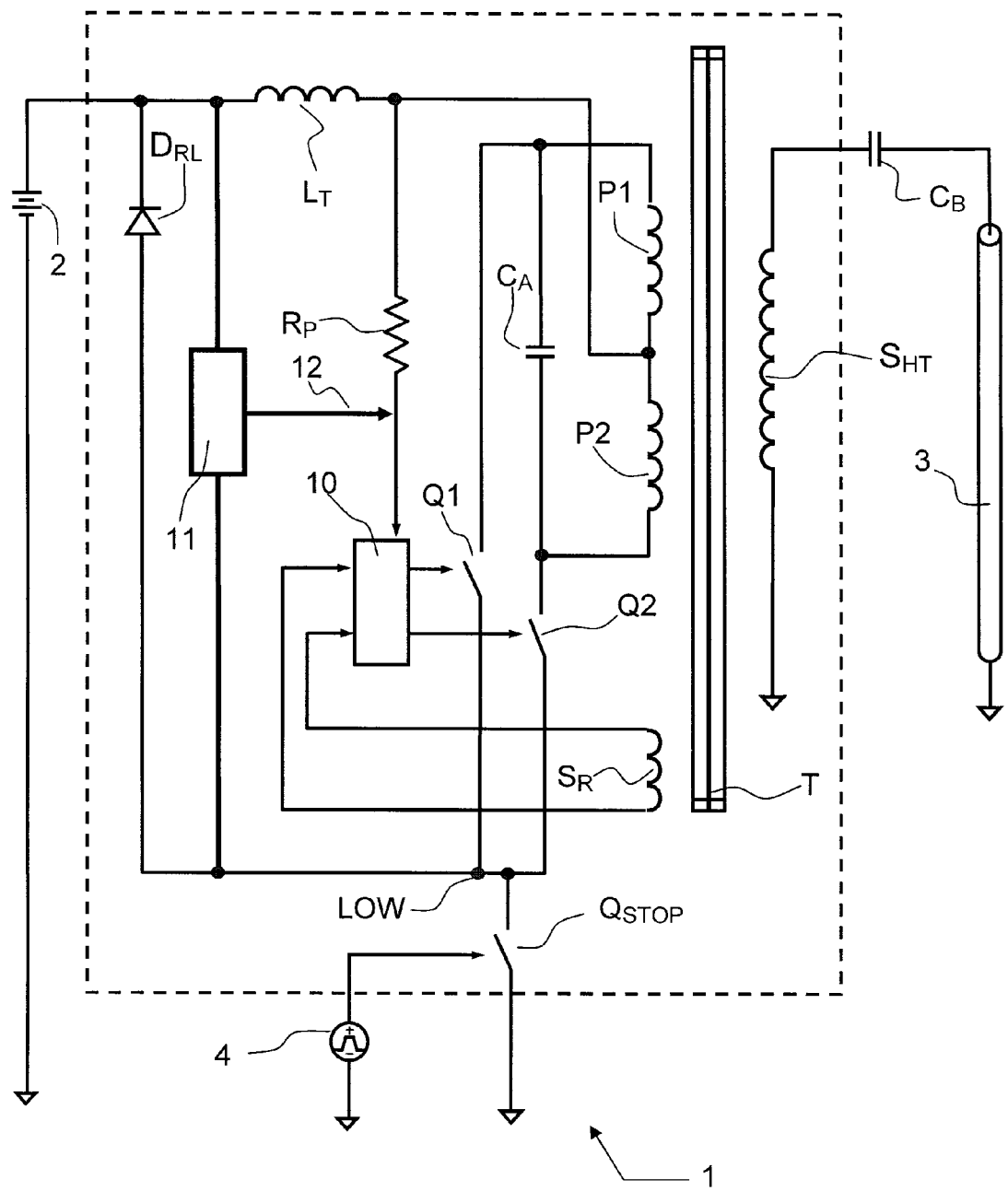
FIG. 7 shows the circuit diagram of a Royer oscillator according to the invention.

A first embodiment is shown in FIG. 7. The electronic device 11 for control of the discharge of the electrical energy stored in the first circuit is controlled by the chopping modulation electronic control device 4 via the switch $Q_{STOP}$.

In this embodiment, the simultaneous closing of the 2 switches for maintaining the oscillation Q1 and Q2 performs the function. This closing of the switches is achieved by acting on the electronic device 10 with the command 12 produced by the electronic control device 11. The intensity of the effect is to be adjusted in order to avoid transient oscillating feedback due to the residual energy in the induction coil $L_T$, since the electronic components are not ideal. Even if they are very short, these asynchronous oscillations can induce flicker in the fluorescent lamps, which is detrimental to the light-emission stability. The advantage of this embodiment is that the original transformer is conserved and only simple electronic components are added.

Figure 8:
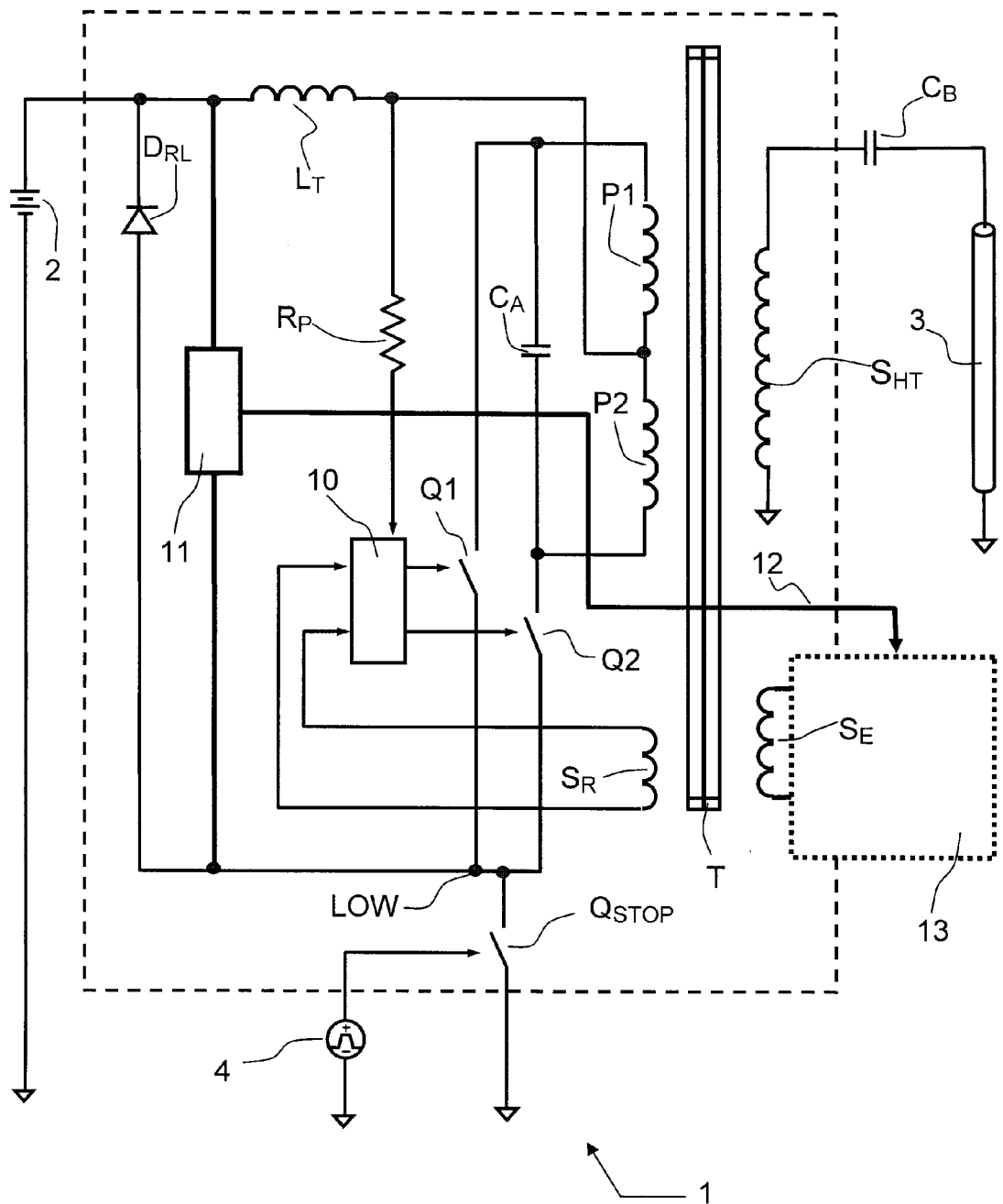
FIG. 8 shows one variant of the Royer oscillator according to the invention.
Figure 9:
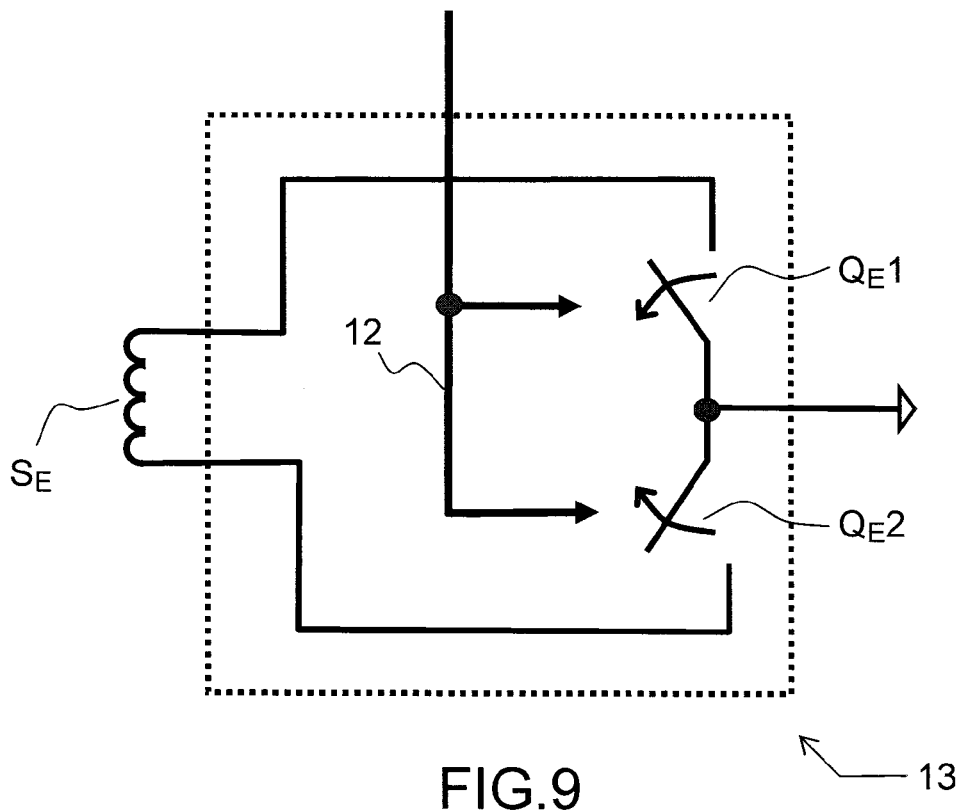

A second embodiment is shown in FIG. 8. In this second embodiment, the circuit comprises an adding circuit 13 comprising an adding winding $S_E$ in the transformer, which is then short-circuited by the electronic switches $Q_E1$ and $Q_E2$ as shown in FIG. 9. These switches can be transistors of either the MOS or of the bipolar type. It is advantageous to connect them as a pair so as to mitigate the effects any potential single-polarity defects inherent in their respective structures.

These switches can be easily controlled because, since the additional winding is floating, it is possible to reference it to electrical ground. In contrast to the first embodiment, this therefore requires the inclusion of the additional winding $S_E$ to the original transformer and of the assembly of switches $Q_E1$ and $Q_E2$.

Figure 10:
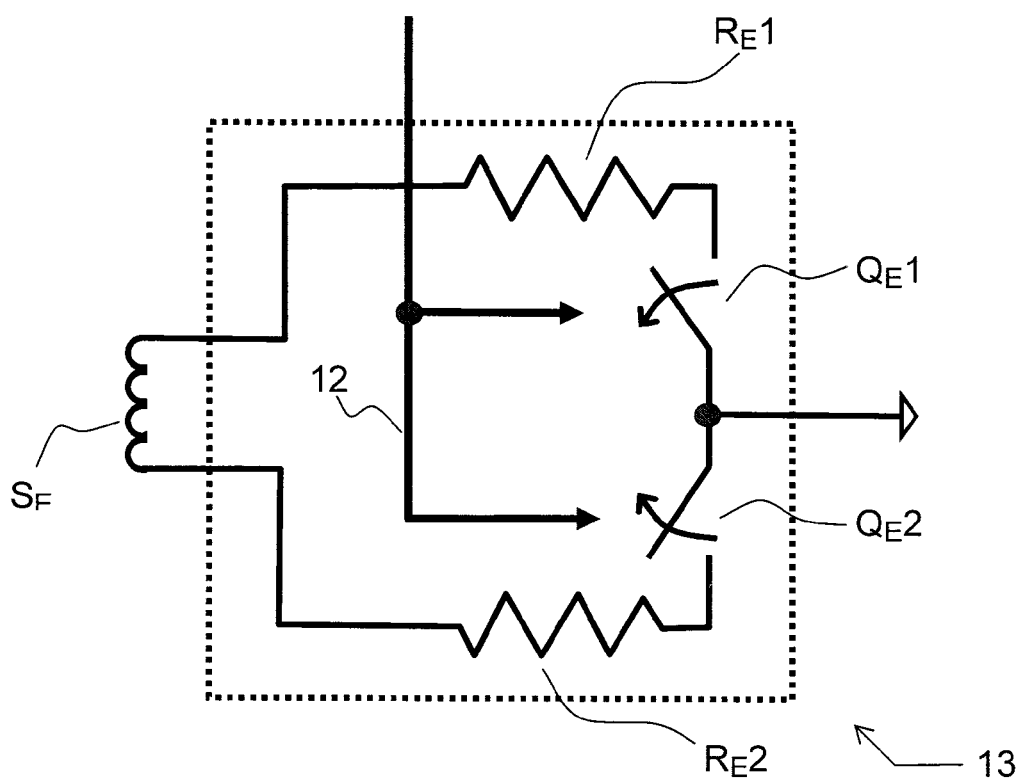

Being completely independent of the oscillator function, the effect of the system is freely adjustable, and a partial effect may also be envisioned with dissipating resistors $R_E1$ and $R_E2$ in series with the switches $Q_E1$ and $Q_E2$ as indicated in FIG. 10.

Figure 11:
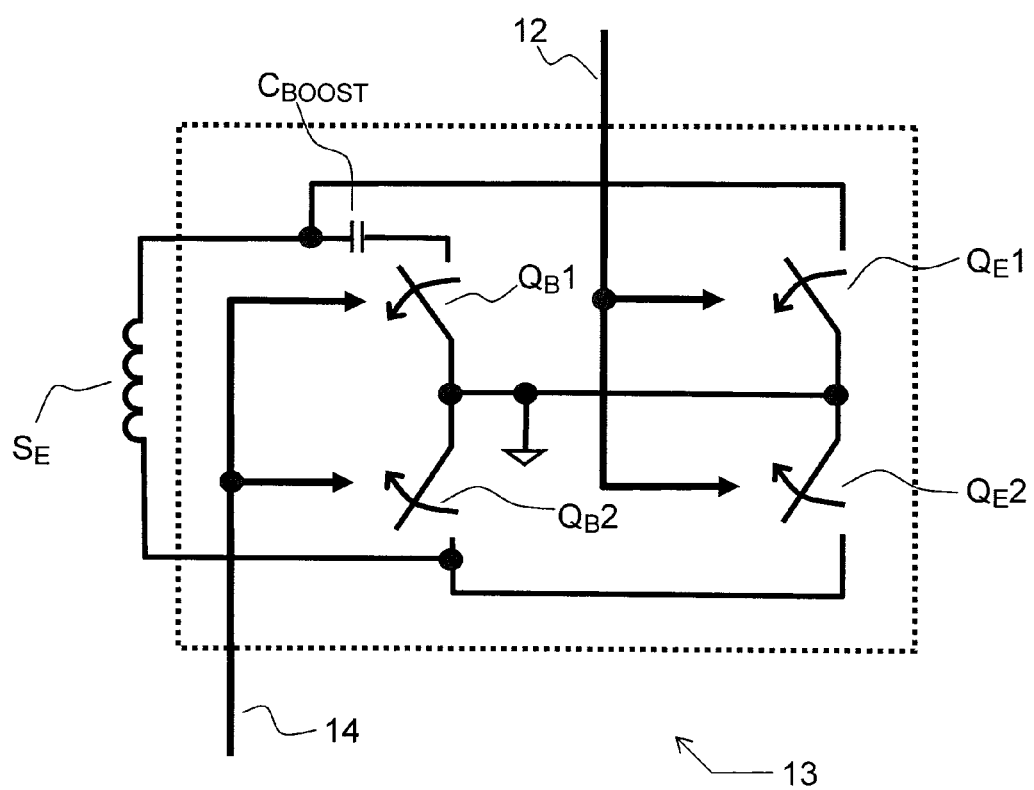

In certain cases, the transistor winding already exists, so as to allow the addition of a tuning capacitor $C_{BOOST}$. This feature is illustrated in FIG. 11. The connection in parallel of this capacitor $C_{BOOST}$ is achieved by means of two switches $Q_B1$ and $Q_B2$ controlled by an external command 14. This capacitor acts as if it were in parallel across $C_A$ and allows the oscillation frequency of the circuit and, consequently, the current flowing in the lamps to be changed. Thus, two switchable ranges of luminance are obtained. This function is referred to as a 'Boost' function.

This shutdown of the oscillator by the short-circuiting of the resonant dipole is not harmful for the circuit if it is effected when the power de-activation switch of the oscillator is definitely open, at the risk of creating a transient short-circuit on the high power supply, or even a permanent short-circuit in the case of a fault in the control of $Q_{STOP}$.

In order to ensure this safety feature, the simultaneous control of Q1 and Q2 must follow the blocking of the switch $Q_{STOP}$. It must never, in any situation, be activated following the action of the switch $Q_{STOP}$. An additional sophistication consists in only acting in a transient manner, and only following the rise in the potential of the node LOW situated at the junction of the switches Q1 and Q2. When the switch $Q_{STOP}$ is blocked, the potential of the node LOW rises from 0 volt toward the level VCC corresponding to the output voltage of the electrical power supply 2. This rise then triggers the electronic control device 11 by capacitive coupling. The abrupt variation in potential that that follows the blocking of the switch $Q_{STOP}$ is then detected. A continuous state as the result of a fault would have no effect.

Figure 12:
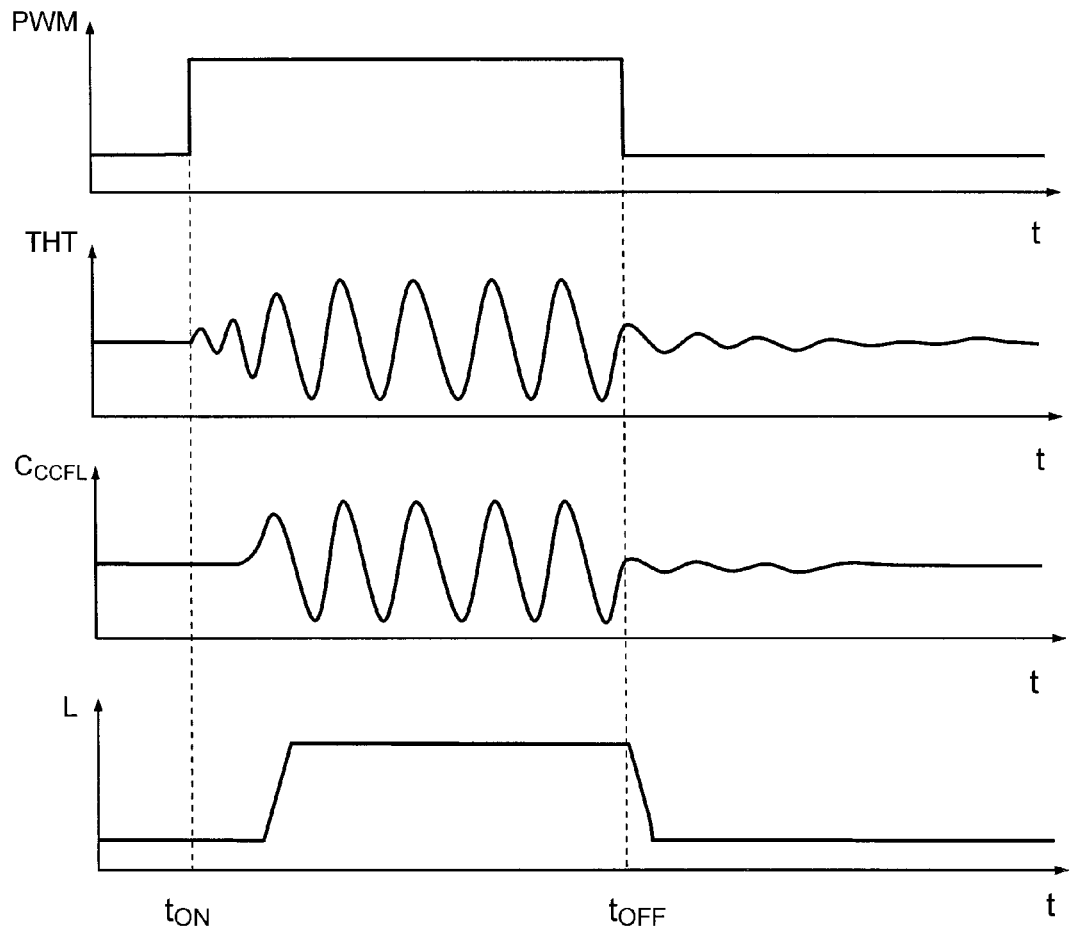
FIG. 12 shows the variations as a function of time of the main parameters in a Royer oscillator according to the invention.

FIG. 12 illustrates the action of the electronic device controlling the discharge of the stored electrical energy. This figure shows as a function of time the variations of the PWM dimming control, the high-voltage output of the Royer oscillator THT, the courant $C_{CCFL}$ flowing through the fluorescent tubes CCFL and the emitted light L.

The active state command begins at time $T_{ON}$ and ends at time $T_{OFF}$. As can be seen, after time $T_{OFF}$, the tubes continue to emit for a shorter time than in the absence of this circuit.

Figure 13:
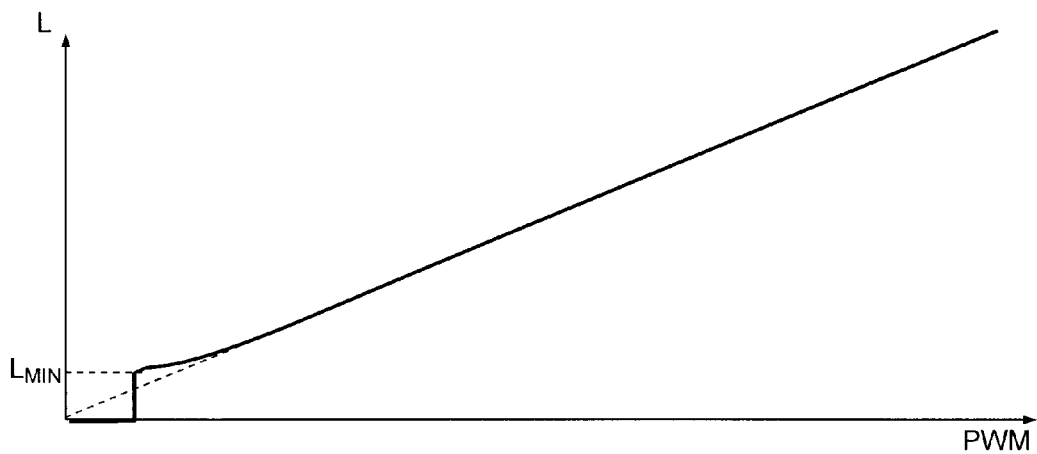
FIG. 13 shows the variations as a function of the dimming control of the emitted luminance in an Royer oscillator according to the invention.

It is possible to trace the variation profile of the quantity of light as a function of the duration of the active state of the PWM; the curve in FIG. 13 is obtained. This curve shows that it is now possible to reach the lower luminance levels by this principal. Since the excitation period $T_{MIN}$ below which no light is emitted is considerably reduced, the minimum emitted light level $L_{MIN}$ is consequently also greatly reduced, which corresponds precisely to the desired effect.

The invention claimed is:

1. An electronic oscillator, allowing the generation, starting from a low DC voltage, of alternating high voltages modulated over time by chopping, comprising:
   a first circuit comprising a voltage transformer with primary and secondary windings
   a second electronic feedback circuit allowing the frequency of the modulated alternating high voltage to be maintained;
   an electronic device for controlling the discharge of an electrical energy stored in the first circuit, said discharge control device being controlled by an electronic control device using chopping modulation,
      wherein the transformer has an adding circuit comprising at least one secondary winding disposed in series between two switches connected to ground, the discharge control device controlling the opening and the closing of said switches.

2. The electronic oscillator as claimed in claim 1, wherein the adding circuit also comprises at least two resistors placed in series between said winding and said switches.

3. The electronic oscillator as claimed in claim 1, wherein the adding circuit comprises an additional circuit comprising, in series, a capacitor and two switches connected to ground.

4. An electrical power supply device for fluorescent tubes, comprising an electronic oscillator as claimed in claim 1.

5. A flat-screen display device comprising at least one source of illumination, comprising at least one fluorescent tube powered by a power supply device as claimed in claim 4.

6. The electronic oscillator as claimed in claim 1, wherein the oscillator is a Royer oscillator.

7. The electronic oscillator as claimed in claim 2, wherein the adding circuit comprises an additional circuit comprising, in series, a capacitor and two switches connected to ground.

8. The electronic oscillator as claimed in claim 4, wherein the adding circuit also comprises at least two resistors placed in series between said winding and said switches.

9. The electronic oscillator as claimed in claim 4, wherein the adding circuit comprises an additional circuit comprising, in series, a capacitor and two switches connected to ground.

10. The electronic oscillator as claimed in claim 4, wherein the oscillator is a Royer oscillator.

11. The electronic oscillator as claimed in claim 8, wherein the adding circuit comprises an additional circuit comprising, in series, a capacitor and two switches connected to ground.

* * * * *